United States Patent Office 3,320,115
Patented May 16, 1967

3,320,115
PROCESS FOR BONDING POLYOLEFIN TO METAL
AND ARTICLE OF MANUFACTURE
Donald E. Reid and Harold M. Spurlin, Wilmington,
Del., assignors to Hercules Incorporated, a corporation
of Delaware
No Drawing. Filed Sept. 3, 1964, Ser. No. 394,308
17 Claims. (Cl. 161—191)

This invention relates to a process for bonding a solid polyolefin to metal, and to the objects so produced.

The art is acquainted with a variety of polymers derived predominantly from propylene. In this specification the term "stereoregular polypropylene" is employed to connote a solid, essentially crystalline polypropylene sometimes called isotactic polypropylene; the term "amorphous polypropylene" is employed to connote a solid, essentially amorphous polymer of propylene sometimes called atactic polypropylene; and the term "propylene polymers" is inclusive of all polymers derived from propylene whether essentially amorphous or essentially crystalline, including copolymers of propylene with one or more other olefinic hydrocarbon monomers. The term "polyethylene" is used herein in the normal sense to mean a solid polymer of ethylene, inclusive of both high and low density types of polyethylene.

It is a characteristic of crystalline polyolefins such as polyethylene and stereoregular polypropylene that they have relatively poor adhesion to metal, a fact which has hindered greatly the development of such polymers as surface coverings for metal.

In accordance with this invention, it has been found that crystalline polyolefins such as polyethylene and stereoregular polypropylene can be bonded strongly to metal by employing as an interlayer between the polyolefin and the metal a phosphorylated propylene polymer containing phosphonic acid substituent groups.

This invention is of prime importance in the art of coating metal. Stereoregular polypropylene, for example, has particularly outstanding qualities for a surface coating, except the ability to adhere to metal. It is insoluble in most organic solvents below about 175° F., is relatively inert, is resistant to weak and strong acids, alkalies and salt solutions, is tough, is inexpensive, etc., and its modification with phosphonic acid groups in accordance with this invention at most detracts only slightly from these desirable qualities while imparting the additional highly desirable quality of tenacious adhesion to metal surfaces. Additionally, the phosphorylated propylene polymers of this invention, containing phosphonic acid substituent groups, bond substantially perfectly to stereoregular polypropylene and other crystalline polyolefins. Accordingly, the preferred embodiment of the present invention, which realizes the advantageous properties of stereoregular polypropylene, comprises applying to metal an undercoating or primer of phosphorylated propylene polymer containing phosphonic acid substituent groups and a top coating of stereoregular polypropylene.

The phosphorylated propylene polymers employed in the present invention as strongly adherent primer coatings on metal are solid resinous polymeric materials containing from about 0.1% to about 2%, and preferably from about 0.2% to about 1.5% of combined phosphorous, based on weight of the polymer.

These phosphorylated propylene polymers containing phosphonic acid substituent groups can be prepared by initially reacting any solid propylene polymer with phosphorous trichloride and air or oxygen. This reaction takes place readily even at room temperature and in the absence of catalysts to introduce phosphonyl dichloride substituent groups into the propylene polymer according to the following equation:

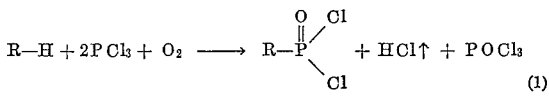
(1)

The degree of phosphorylation is readily followed by measuring the amount of hydrogen chloride evolved. The chlorine atoms in the phosphonyl dichloride substituent groups are very labile and are then replaced with hydroxyl groups by reaction with water to convert the phosphonyl dichloride substituent groups into phosphonic acid substituent groups according to the following equation:

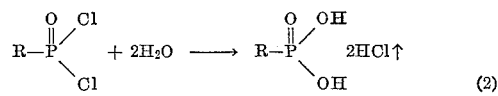
(2)

The phosphorylation reaction as depicted by Equation 1 above can be carried out either as a homogeneous solution process in which the propylene polymer is dissolved in a solvent which is inert to the phosphorylation reaction, or as a heterogeneous suspension process in which the propylene polymer in fine solid particulate form is suspended in a solvent which is inert to the phosphorylation reaction. Moreover, either amorphous or crystalline propylene polymers can be employed to prepare the phosphorylated propylene polymers containing phosphonic acid substituent groups.

It is a characteristic of amorphous propylene polymers that they are soluble in hydrocarbon and chlorinated hydrocarbon solvents at ambient temperatures. Accordingly, when amorphous polypropylene or amorphous copolymers of propylene with ethylene, or with ethylene and one or more other olefinic hydrocarbon monomers are employed to prepare the phosphorylated propylene polymers of this invention, a solution process is employed for such phosphorylation reaction. In this case the amorphous propylene polymer is dissolved in a solvent such as chlorobenzene which is inert to the phosphorylating reaction and the polymer in solution is reacted with phosphorous trichloride and air or oxygen. If desired, the amorphous propylene polymer may be dissolved directly in excess phosphorous trichloride, with or without dilution with a solvent which is inert to the phosphorylating reaction. The resultant phosphonyl dichloride modified propylene polymer is then hydrolyzed by reaction with water to produce the phosphorylated propylene polymer containing phosphonic acid substituent groups in accordance with the present invention. The resulting phosphonic acid modified amorphous propylene polymer is soluble in hydrocarbon and chlorinated hydrocarbon solvents at room temperature.

When crystalline polypropylene is employed to prepare the phosphorylated propylene polymers of this invention, either a solution process or a suspension process may be employed for the phosphorylation reaction. Since stereoregular polypropylene is insoluble in most organic solvents below about 175° F., it becomes necessary to employ an elevated temperature, usually on the order of about 200° F.–270° F., in order to phosphorylate stereoregular polypropylene by a solution process. In this case the stereoregular polypropylene is dissolved at an elevated temperature as indicated above in a solvent such as chlorobenzene which is inert to the phosphorylation reaction and the resulting solution is reacted with phosphorous trichloride and air or oxygen at the elevated temperature. Upon cooling the reaction mixture, the phosphorylated stereoregular polypropylene containing phosphonyl dichloride substituent groups separates out in fine particle form, and after filtering and washing with a solvent such as benzene, the phosphonyl dichloride modified polymer is then hydrolyzed with water, usually at the boiling point, to produce the phosphonic acid modified stereoregular polypropylene.

As indicated above, stereoregular polypropylene can also be phosphorylated by a suspension process. In this case, the stereoregular polypropylene, preferably in fine particle size, is suspended at room temperature or slightly elevated temperature in a solvent such as chlorobenzene which is inert to the phosphorylation reaction to form a slurry, and the resulting slurry is reacted with phosphorous trichloride and air or oxygen at ambient temperatures to produce a slurry or suspension of finely divided phosphonyl dichloride modified stereoregular polypropylene. Upon draining off the mother liquor of the reaction mixture and washing the product with a solvent such as benzene, the phosphonyl dichloride modified polymer is then hydrolyzed with water, usually at the boiling point, to produce the phosphorylated stereoregular polypropylene containing phosphonic acid substituent groups.

The phosphorylated stereoregular polypropylene containing phosphonic acid substituent groups prepared by either a solution or a suspension process is insoluble in most organic solvents below about 175° F., but is soluble in hydrocarbon and chlorinated hydrocarbons above about 175° F.

The temperature of the phosphorylation reaction may range anywhere from room temperature and lower to about the decomposition temperature of the propylene polymer. Moreover, the temperature at which the phosphorylation is carried out appears to have very little if any effect upon the rate of phosphorylation. Thus, any convenient temperature below the temperature where the propylene polymer begins to degrade or decompose can be employed. Temperatures from about 20° C. to about 100° C. are preferred, however.

It is both desirable and expedient to employ an amount of phosphorous trichloride considerably in excess of the calculated amount needed to effect the desired degree of phosphorylation, preferably from about 400% to about 2,000% in excess of the calculated amount needed. Similarly, air or oxygen in excess of the calculated amount needed is also employed.

Suitable organic solvents for the phosphorylation reaction are aromatic and chlorinated hydrocarbons which are inert to the phosphorylation reaction, i.e., aromatic and chlorinated hydrocarbons which are free of reactive aliphatic groups. Some typical useful solvents for this reaction include, for example, benzene, chlorobenzene, carbon tetrachloride, tetrachloroethylene, chloronaphthalene, and the like.

The bonding process of this invention can be accomplished by either lamination or coating technique, or by a combination of such techniques. It is possible, for example, to prepare a laminate from sheets or foils of metal, phosphonic acid modified propylene polymer and polyolefin and consolidate the laminate under heat and pressure. Alternatively, the phosphonic acid modified propylene polymer can be applied to the metal via a coating technique and the polyolefin bonded to the thus primed metal via lamination; or both the phosphonic acid modified propylene polymer and polyolefin can be applied via coating technique. Useful coating techniques include application from a solution or a dispersion of the polymeric material in a volatile oganic solvent, from a hot melt of the polymeric material, as well as such techniques as flame spraying, electrostatic spraying, airless atomization of a hot melt, and fluidized bed application.

For example, the strongly adhering primer coats of phosphorylated propylene polymers containing phosphonic acid substituent groups can be applied to the metal substrate in a variety of ways. The phosphorylated propylene polymers derived from amorphous polypropylene or amorphous copolymers of propylene with ethylene, or with ethylene and one or more other olefinic hydrocarbon monomers are most conveniently applied by spray application of about a 0.1% to about a 5% solution of the phosphonic acid modified amorphous propylene polymer in an aliphatic hydrocarbon, aromatic hydrocarbon, or chlorinated hydrocarbon such as heptane, decane, toluene, xylene, cumene, chlorobenzene, and the like. An alternative method is to dip the metal substrate into a dilute solution of the phosphorylated amorphous propylene polymer.

Crystalline phosphorylated propylene polymers derived from stereoregular polypropylene and the like can be applied by dipping the metal substrate into a hot solution of the phosphorylated propylene polymer in a hydrocarbon or chlorinated hydrocarbon solvent at any convenient temperature between about 175° F. and the boiling point of the solvent. However, the crystalline phosphorylated propylene polymers are more conveniently applied by spraying a dilute suspension or dispersion of the phosphonic acid modified propylene polymer particles in a hydrocarbon or chlorinated hydrocarbon solvent at room temperature onto the metal substrate. Suitable dispersions are conveniently made by preparing a hot solution of the phosphonic acid modified stereoregular polypropylene and allowing the solution to cool to room temperature whereupon the phosphonic acid modified stereoregular polypropylene separates out in extremely fine particles which remain in suspension.

After application of the phosphonic acid modified propylene polymer primers of this invention, the preferred procedure is to bake the primer coat at about 175° C. to about 225° C. for a short time, from about 1 to about 6 or 7 minutes. This baking is optional, however, and is not absolutely necessary, although optimum results are obtained when the primer coat is baked prior to application of the top coat.

It is an outstanding feature of this invention that the phosphonic acid modified propylene polymer primer coats are effective in very thin layers; a thickness as low as 0.1 mil or even thinner is fully satisfactory in most instances. However, the phosphonic acid modified propylene polymer primer coat can be applied in substantially greater thickness without altering its effectiveness.

As indicated hereinabove, the polyolefin topcoats can be applied to the phosphonic acid modified propylene polymer primed substrate in many ways. A preferred embodiment of the invention involves spray or dip application of a dispersion or suspension of stereoregular polypropylene in very fine particle form in a hydrocarbon or chlorinated hydrocarbon solvent at ambient temperature, followed by fusion of this coating by baking at a temperature from about 165° C. to about 250° C. for a period from about 2 to about 20 minutes. A convenient baking cycle is about 6 minutes at about 200° C. After baking, the coating can be quenched in cold water to develop maximum gloss. The polyolefin top coat may be a one-coat or a multiple-coat system, as desired.

Although the preferred polyolefin top coat is stereoregular polypropylene, the invention is by no means limited thereto. The invention is equally applicable to all crystalline polyolefins, including for example, polyethylene, crystalline copolymers of ethylene and propylene with each other or with another 1-olefin such as butene-1 and the like, ethylene-propylene block copolymers, alloys of stereoregular polypropylene with high molecular weight polymers of isobutylene, and the like. The polyolefin can also contain other ingredients commonly employed in metal-coating compositions, including, by way of example, pigments, dyes, plasticizers, reactive resins, and the like, provided they do not detract from the adherence of the coating to the substrate.

The process of this invention can be applied to any metal surface, but is particularly satisfactory when applied to surfaces of steel, aluminum, copper, tinplate, and the like. For best adhesion, the metal surface should be clean, and, if desired, sand blasted or otherwise modified by any of the common pretreatments used to prepare metal surfaces for coatings, such as conventional phosphate or chromate treatments. Further, the metal can be either in the form of foil or in the form of a rigid object.

The general nature of the invention has been set forth, and the following examples illustrate some specific embodiments thereof. In the examples, parts and percentages are by weight unless otherwise stated.

*Example 1*

One hundred (100) parts of stereoregular polypropylene having a birefringent melting point of about 168° C. and a reduced specific viscosity (RSV) of 2, as measured on a 0.1 gram solution of the polypropylene in 100 ml. of decahydronaphthalene at 135° C., and containing, as a stabilizer, about 100 p.p.m. of 2,6 - ditertiarybutyl-p-cresol, by weight of the polymer, and 2,000 parts of chlorobenzene were charged at room temperature to a reaction vessel equipped with a condenser, a stirrer, a dropping funnel, a thermometer, and an air inlet tube disposed to bubble air through the reaction mixture. The mixture was heated with agitation to 130° C. until the stereoregular polypropylene dissolved in the chlorobenzene. The resulting solution was then cooled to 100° C., and a current of air was started bubbling through the agitated solution while maintaining the solution at 100° C. Twenty (20) parts of phosphorous trichloride were then added to the agitated reaction mixture at 100° C. over a period of 17 minutes, and air was bubbled through the reaction mixture for an additional 50 minutes. The reaction mixture was then allowed to cool, whereupon phosphorylated stereoregular polypropylene containing phosphonyl dichloride substituent groups precipitated from the reaction mixture in finely divided form. This initial product was separated from the reaction mixture by filtration and was washed with benzene. This initial product containing phosphonyl dichloride substituent groups had a reduced specific viscosity of 1.2, as measured by the method described above in this example, and contained 0.8% phosphorous and 0.3% chlorine by weight. Forty (40) parts of this initial product were then hydrolyzed in 200 parts of boiling water containing 0.1 part of Brij 35 (an ethylene oxide adduct of lauryl alcohol) for 2 hours under reflux, washed with water and dried to produce a phosphorylated stereoregular polypropylene containing phosphonic acid substituent groups. This hydrolyzed product contained 0.16% phosphorous and 0.03% chlorine by weight, and had a reduced specific viscosity of 1.1, as measured by the method previously described in this example.

Fifteen (15) parts of the above phosphonic acid modified stereoregular polypropylene were dissolved in 135 parts of a mixture of light petroleum hydrocarbons boiling in the kerosene range (150° C.–280° C.) by heating to a temperature of 120° C., and 0.075 part of Topanol CA, which is the reaction product of 1 mole of crotonaldehyde with 3 moles of 3-methyl-6-tertiarybutyl phenol, and 0.0375 part of LTDP, which is dilaurylthiodipropionate, were added to the solution as stabilizers. Panels 4 inches x 6 inches of phosphate treated 18-gauge sheet steel (Bonderite 1000 treatment), cold-rolled 18-gauge sheet steel, aluminum sheet (aluminum 6061), and phosphate-chromate treated aluminum sheet (Alodine 401–45 treated aluminum) were dipped in the hot solution, baked at 205° C. for 6 minutes, and quenched in cold water to provide primer coats 0.3 to 0.4 mil in thickness of phosphorylated stereoregular polypropylene containing phosphonic acid substituent groups. These primer coats were tested for adhesion to the several metal substrates by the following test procedure:

One square inch of the primed surface of a panel of each of the metal substrates was cross-hatched with razor blade cuts 1/16 inch apart and at right angles to each other. A strip of conventional transparent pressure-sensitive "cellophane" tape was applied over the cross-hatched area with sufficient pressure to assure uniform adhesion throughout the contact area. The tape was then jerked from the cross-hatched surface, and the cross-hatched area of the primer coat was observed to determine what part, if any, of the cross-hatched primer coat was removed by the tape. In this test, a rating of "excellent" was assigned if no coating was stripped from the panel; a rating of "good" if less than 25% of the coating was stripped; a rating of "fair" if 25% to 50% of the coating was stripped; a rating of "poor" if 50% to 75% of the coating was stripped; and a rating of "very poor" if more than 75% of the coating was stripped from the panel.

The primer coats of the phosphonic acid modified stereoregular polypropylene on all four of the above metal substrates were rated as having "excellent" cross-hatch adhesion by the above test.

Top coatings of stereoregular polypropylene were applied to the primed surfaces of other, replicate panels of both the Bonderite 1000 treated sheet steel and the aluminum 6061 sheet primed as described above with 0.3 to 0.4 mil primer coats of phosphorylated stereoregular polypropylene containing phosphonic acid substituent groups. This was accomplished by dipping the primed metal panels into a dispersion of 105 parts of stereoregular polypropylene particles having an average diameter of 30–50 microns in 220 parts of xylene, and containing 0.5% Topanol CA and 0.25% LTDP as stabilizers, based on polymer weight, baking the wet coatings for 6 minutes at 205° C. and quenching the fused coatings in cold water. The resulting fused, quenched coatings were aproximately 3 mils thick and had "excellent" cross-hatch adhesion when tested as described above.

For the purpose of showing the effectiveness of the method of this invention for bonding crystalline polyolefins to metal, a control was carried out by dipping panels of the same metals employed in this example, but which had not been primed with phosphorylated stereoregular polypropylene containing phosphonic acid substituent groups, as described above, into the same dispersion of stereoregular polypropylene, and baking and quenching as described above in this example. The resulting coatings of stereoregular polypropylene on the unprimed metal substrates were all rated as having "very poor" cross-hatch adhesion when tested as described in this example.

*Example 2*

Two hundred (200) parts of stereoregular polypropylene having substantially the same melting point, reduced specific viscosity, and stabilizer as described for the stereoregular polypropylene of Example 1, and in the form of particles having an average diameter of 30–50 microns, were dispersed in 1000 parts of chlorobenzene and charged at room temperature and with agitation to the same reaction vessel described in Example 1. At 25° C., 80 parts of phosphorous trichloride were added to the dispersion and air was bubbled through the agitated dispersion. The temperature of the dispersion rose to 30° C. over a period of 1 hour and then the dispersion was heated to 70° C. and held at 70° C. with agitation for 1.5 hours while air was passed through the dispersion. The dispersion was then cooled, filtered and the collected, finely divided solid reaction product of phosphorylated stereoregular polypropylene containing phosphonyl dichloride substituent groups was washed 4 times with benzene. Fifty (50) parts of the resulting washed reaction product were dispersed in about 400 parts of water containing 0.1 part by weight of Brij 35 and heated for 1 hour at the boiling point under reflux, then filtered, washed first with water, then with benzene, and dried to produce a phosphorylated stereoregular polypropylene containing phosphonic acid substituent groups. This product had a reduced specific viscosity, measured as described in Example 1, of 1.3 and contained 0.18% phosphorous and 0.02% chlorine by weight. This phosphorylated stereoregular polypropylene product was applied to panels of Bonderite 1000 treated steel, cold-rolled steel, aluminum 6061, and Alodine 401–45 treated aluminum as a primer and the primed metal substrates were topcoated with stereoregular polypropylene, as described in Example 1. The resulting coatings had "excellent" cross-hatch adhesion to all of the substrates when tested for cross-hatch adhesion as described in Example 1.

Other replicate test panels of the above metals, primed and topcoated as described above in this example, were evaluated for adhesion retention after exposure to the following conditions of exposure:

(1) Immersion in aqueous detergent solution for 9 days at 70° C. (1% by weight of Tide);
(2) Immersion in boiling water for 6 hours;
(3) Exposure for 500 hours to 100% humidity at 90° F. (TTP-141 b-620.1, 1949);
(4) Exposure to 5% salt fog at 90° F. for 500 hours (ASTM B-117-61).

All of the coated panels after exposure to the above environments had "excellent" cross-hatch adhesion when tested for cross-hatch adhesion as described in Example 1.

*Example 3*

A phosphonic acid modified stereoregular polypropylene containing 0.5% phophorous and 0.04% chlorine, and having a reduced specific viscosity of 0.8 measured as described in Example 1 was prepared substantially in accordance with the procedure described in Example 2. Six (6) parts of this phosphonic acid modified stereoregular polypropylene, 0.05 part of Topanol CA, 0.025 part of LTDP, and 600 parts of xylene were heated together until solution occurred, and the solution was allowed to cool to room temperature whereupon the phosphorylated stereoregular polypropylene containing phosphonic acid substituent groups separated from solution in the form of very fine solid particles dispersed in the xylene. This dilute dispersion was spray applied to Bonderite 1000 treated steel panels, to Alodine 401–45 treated aluminum panels, and to degreased 2-mil thick aluminum foil. These primed metal substrates were baked for 3 minutes at 200° C., and were then laminated to stereoregular polypropylene film containing 0.5% Topanol CA and 0.25% LTDP by weight, as stabilizers, in a hydraulic press under heat and pressure. To accomplish this, shims of appropriate thickness were used to give 10-mil topcoatings on the primed surface of the metal panels, and to give 2-mil topcoatings on the primed surface of the aluminum foil. The lamination was done on a 10-inch Elmes press at 410° F., using a 1-minute heat-up and 4 minutes at 7 tons total pressure. The coated panels and foil were then quenched in cold water to yield coatings which had "excellent" cross-hatch adhesion to all of the metal substrates when tested by the cross-hatch adhesion test described in Example 1.

*Example 4*

A fine dispersion of the hydrolyzed phosphonic acid modified stereoregular polypropylene described in Example 1 was prepared by dissolving 6 parts of said modified stereoregular polypropylene, 0.05 part of Topanol CA, 0.025 part of LTDP in 600 parts of xylene at about 120° C., and cooling the resulting solution to room temperature. Bonderite 1000 treated steel, Bonderite 100 treated steel, and Alodine 401–45 treated aluminum panels were primed by spraying with this dispersion and then baking at 200° C. for 2 minutes. The primer thickness was less than 0.1 mil. The primed panels were then topcoated by spraying with a dispersion of 200 parts of stereoregular polypropylene particles having an average particle diameter of 30–50 microns, 1.0 part of Topanol CA, 0.5 part of LTDP, 0.08 part of calcium oxide, in 507 parts of xylene and 78 parts of a mixture of light petroleum hydrocarbon boiling in the kerosene range (150° C.–280° C.), followed by baking at 205° C. for 5 minutes and quenching in cold water. A second topcoating of the same dispersion of stereroregular polypropylene used for the first topcoat was then applied to the coated panels, baked and quenched in the same manner as described for the first topcoat. The resultant composite coatings on all metal substrates had thickness in the range from 2.9 to 3.2 mils, and had "excellent" cross-hatch adhesion to all of the metal substrates when tested for cross-hatch adhesion as described in Example 1. Coatings of stereoregular polypropylene prepared on the same metal substrates, from the same dispersion and by the same procedure described in this example, but without the primer coating of phosphorylated stereoregular polypropylene containing phosphonic substituent groups, had "very poor" cross-hatch adhesion to all of the metal substrates when tested for cross-hatch adhesion as described in Example 1.

*Example 5*

Fifty (50) parts of amorphous polypropylene having a reduced specific viscosity of 2.5, measured as described in Example 1, and 550 parts of chlorobenzene were charged to the same reaction vessel described in Example 1. The mixture was heated with agitation to 131° C. for 30 minutes to facilitate solution of the amorphous polypropylene in the chlorobenzene. The resulting clear, colorless solution was then cooled to 32° C. and 20 parts of phosphorous trichloride were added to the solution, and air was bubbled through the solution for 3 hours with agitation. During the course of the phosphorylating reaction, the viscosity changed from a viscous solution to a water-thin viscosity. A solution of 0.1 part of 2,5-di-tertiary-amyl hydroquinone (Santovar A) in 8 parts of acetone was added to the reaction mixture solution as stabilizer, and the phosphorylated amorphous polypropylene was precipitated by dripping the reaction mixture into approximately 4,000 parts of agitated acetone. The precipitated phosphorylated amorphous polypropylene was then hydrolyzed in 500 parts of boiling water containing 0.1 part of Brij 35 for 2 hours under reflux, followed by cooling, filtration, washing with water and drying to yield 48.5 parts of phosphorylated amorphous polypropylene containing phosphonic acid substituent groups. This phosphonic acid modified amorphous polypropylene contained 1.1% phosphorous and 0.5% chlorine by weight, and had a reduced specific viscosity of 0.2, measured as described in Example 1.

Ten (10) parts of the above phosphonic acid modified amorphous polypropylene were easily dissolved in 166 parts of xylene containing 0.08 part of Topanol CA, 0.04 part of LTDP and 0.007 part of calcium oxide at room temperature. Panels of Bonderite 1000 treated steel, cold-rolled steel, aluminum 6061 and Alodine 401–45 treated aluminum were primed by dipping into the above phosphonic acid modified amorphous polypropylene solution and then baking the panels at 205° C. for 4 minutes. The thus primed panels were then topcoated with a 20-mil wet coating of a dispersion containing 100 parts of stereoregular polypropylene particles having an average diameter of 30–50 microns, 209 parts of light petroleum hydrocarbons boiling in the kerosene range (150° C.–280° C.), 0.5 part of Topanol CA and 0.25 part of LTDP, baking at 205° C. for 6 minutes, and quenching in cold water. The coatings had "excellent" cross-hatch adhesion to all of the substrates when tested for cross-hatch adhesion as described in Example 1. Similar stereoregular polypropylene coatings applied to the above metal substrates without the primer had "very poor" cross-hatch adhesion to all of the metal substrates.

What we claim and desire to protect by Letters Patent is:

1. The process of bonding a crystalline polyolefin to metal which comprises employing as an interlayer between the polyolefin and metal, a phosphorylated propylene polymer containing phosphonic acid substituent groups.

2. The process of claim 1 in which the polyolefin is stereoregular polypropylene.

3. The process of claim 1 in which the polyolefin is polyethylene.

4. The process of claim 1 in which the phosphorylated propylene polymer contains from about 0.1% to about 2% by weight of combined phosphorous.

5. The process of claim 1 in which the propylene polymer is stereoregular polypropylene.

6. The process of claim 1 in which the propylene polymer is amorphous polypropylene.

7. The process of claim 1 in which the metal is aluminum.

8. The process of claim 1 in which the metal is steel.

9. The method of bonding on metal which comprises the steps of applying to the surface of the metal a primer coating of phosphorylated propylene polymer containing phosphonic acid substituent groups and then applying to said primer coating as a top coating a coating containing as its essential film-forming component stereoregular polypropylene.

10. A metal object having an adherent, uniform layer of crystalline polyolefin bonded thereto through an intermediate layer of a phosphorylated propylene polymer containing phosphonic acid substituent groups.

11. The object of claim 10 in which the polyolefin is stereoregular polypropylene.

12. The object of claim 10 in which the polyolefin is polyethylene.

13. The object of claim 10 in which the phosphorylated propylene polymer contains from about 0.1% to about 2% by weight of combined phosphorous.

14. The object of claim 10 in which the propylene polymer is stereoregular polypropylene.

15. The object of claim 10 in which the propylene polymer is amorphous polypropylene.

16. The object of claim 10 in which the metal object is steel.

17. The object of claim 10 in which the metal object is aluminum.

References Cited by the Examiner

UNITED STATES PATENTS

| | | | |
|---|---|---|---|
| 2,366,895 | 1/1945 | Griffith | 161—191 |
| 2,541,027 | 2/1951 | Bradley | 161—191 X |
| 2,675,339 | 4/1954 | Zenftman | 117—138.8 X |
| 3,079,278 | 3/1963 | Naudain | 117—138.8 X |
| 3,155,744 | 11/1964 | Forrestal | 161—216 X |
| 3,192,092 | 6/1965 | Schonhorn | 161—216 X |

FOREIGN PATENTS 218,438    7/1957    Australia.

EARL M. BERGERT, *Primary Examiner.*

CLIFTON B. COSBY, *Examiner.*